Patented May 4, 1948

2,440,909

UNITED STATES PATENT OFFICE 2,440,909

PHENOLIC CONDENSATION PRODUCTS

Joseph B. Niederl, Brooklyn, N. Y.

No Drawing. Application October 28, 1944,
Serial No. 560,900

3 Claims. (Cl. 260—619)

This invention relates to phenolic condensation products obtained by condensing various phenols with phenolic alcohols possessing a $tt$-octyl group ("diisobutyl" group, $$(CH_3)_3CCH_2C(CH_3)_2—)$$

as one of the side chains, the condensation being brought about by the use of a kationoid catalyzer but without the use of formaldehyde or any other carbonyl compound.

For instance, this invention includes the use of 2,6-dimethylol-4-$tt$-octylphenol)

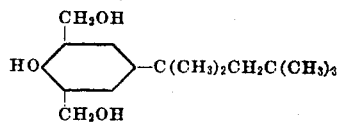

(J. B. Niederl, Ind. Eng. Chem., vol. 30, p. 1272) and of 6-methylol-2-methyl-4-$tt$-octylphenol

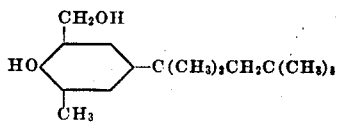

in condensations with various types of phenols, such as: phenol (carbolic acid) itself, the cresols, the ethylphenols, the xylenols, p-$t$-butyl-, p-$t$-amyl-, p-$tt$-octylphenol ("diisobutyl phenol"), the diisobutyl cresols, and also the naphthols. Also various types of mono and dihalogenated phenols can be employed in these condensations, leading to the formation of halogenated phenolic condensation products heretofore not obtainable.

The condensations are carried out with or without the use of an inert solvent, such as glacial acetic acid. As catalyst hydrochloric acid, either in concentrated aqueous solution or in gas form is preferred, although the invention is not limited to this catalyst, as sulfuric acid, boron trifluoride and similar types of kationoid catalyzers may also be employed.

Through this present invention two general types of phenolic condensation products are obtainable, namely "polymeric phenolic condensation products" and "tri-nuclear phenolic condensation products."

The "polymeric" phenolic condensation products are obtained by condensing the 2,6-dimethylol-4-$tt$-octylphenol with phenol, or with mono alkylated or mono halogenated phenols, such as: phenol, the cresols, the ethylphenols, p-$t$-butyl-, p-$t$-amyl-, p-$tt$-octyl phenol, o-, m-, p-chlorophenol and the like.

The "tri-nuclear" phenolic condensation products are prepared by condensing the same phenolic di-alcohol with phenols having only one reactive ring hydrogen atom available for condensation, such as: 2,4- or 2,6-dimethyl phenol, 2,4- or 2,6-dichloro phenol, 4-alkyl-2-methyl phenols, 4-$tt$-octyl-2-methyl phenol, and other 2,4- or 2,6-dialkylphenols.

The "tri-nuclear" phenolic condensation products can also be prepared by condensing the corresponding phenolic mono alcohol, the 6-methylol-2-methyl-4-$tt$-octylphenol with phenols having two reactive ring hydrogen atoms available for condensation such as any o- or p-mono alkylated, or o- or p-mono halogenated phenols which includes: o- or p-chloro-, o- or p-bromo-, o- or p-ioda phenol, o- or p-cresol, o- or p-ethylphenol, p-$t$-butyl, p-$t$-amyl and p-$tt$-octylphenol.

POLYMERIC PHENOLIC CONDENSATION PRODUCTS

Example 1.—Condensation of 2,6-dimethylol-4-tt-octylphenol with p-cresol

Five hundredths of a mol (13.3 g.) of 2,6-dimethylol-4-$tt$-octylphenol is dissolved in 50 grams of p-cresol. To this solution is then added one ml. of concentrated hydrochloric acid. The reaction mixture is then allowed to stand for about 48 hours. The reaction product thus prepared can be isolated in several ways. One method consists in removing both the catalyst and the excess p-cresol by steam distillation. Another method is to add 50 ml. of petroleum ether to the reaction mixture and allowing the condensation product to separate. The yield of condensation product is practically quantitative calculated on the basis of the di-alcohol used. M. P. 114–120° C. The product yields an acetate upon refluxing with acetic acid anhydride. M. P. 90–93° C.

Example 2.—Condensation of 2,6-dimethylol-4-tt-octylphenol with p-tt-octylphenol One tenth mol each of 2,6-dimethylol-4-$tt$-octylphenol (25.6 g.) and p-$tt$-octylphenol (20.6 g.) are mixed with 50 ml. of glacial acetic acid, and the mixture is then well stirred to effect gradual solution of the reactants. Dry hydrogen chloride gas is then bubbled into the solution for two hours. The reaction mixture is then set aside for 24 hours and is then poured into water. An oil separates out which gradually solidifies on standing. The solid condensation product is then separated and dried in vacuum. The yield of polymeric condensation product is practically quantitative. M. P. 92-98° C. (approx.). The product can be acetylated by refluxing with acetic anhydride for 2 hours. M. P. of the acetate: 70-73° C.

In the above manner of using the method given in Example 1, the 2,6-dimethylol-4-tt-octylphenol can be condensed with any other p-substituted phenols such as p-ethylphenol, p-t-butylphenol, p-t-amylphenol, or p-halogenated phenols.

The structure of these polymeric condensations appears to be as follows:

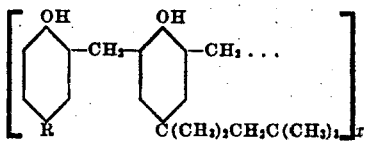

R=—CH₃; —C₂H₅; —C₄H₉; —C₅H₁₁; —C₆H₁₃; —Cl; —Br; —I

Instead of p-substituted phenols, o- or m-substituted phenols can also be employed giving rise to the formation of related types of polymeric condensation products.

TRI-NUCLEAR PHENOLIC CONDENSATION PRODUCTS

*Example 3.—Condensation of 6-methylol-2-methyl-4-tt-octylphenol with 4-tt-octylphenol*

Five hundredths of a mol (10.3 g.) of 4-tt-octylphenol and one tenth of a mol (25 g.) of 6-methylol-2-methyl-4-tt-octylphenol is dissolved in 50 ml. glacial acetic acid. Dry hydrogen chloride gas is then passed into this solution for 2.5 hours. On standing, an oil gradually settles out which is taken up in ether and then washed several times with water. The ether layer is then separated, dried and the ether evaporated off. A viscous oily residue results which gradually crystallizes upon standing in a vacuum desiccator. The yield of tri-nuclear condensation product 2,6 - di-(2-hydroxy-3-methyl-5-tt-octyl) benzyl-4-tt-octylphenol is quantitative. M. P. 58–60° C. The product may be acetylated by refluxing it with acetic acid anhydride for about two hours. M. P. 30-35°C.

In a similar manner or using the condensation method given in Example 4, two mols of 6-methylol-2-methyl-4-tt-octylphenol can be condensed with one mol of any p-substituted phenols such as p-cresol, p-ethylphenol, p-t-butylphenol, p-t-amylphenol or p-halogenated phenols to yield analogous tri-nuclear phenolic condensation products of the following structure:

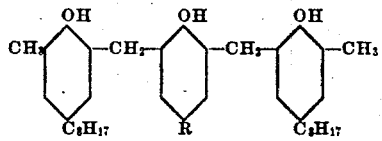

R=—CH₃; —C₂H₅; —C₄H₉; —C₅H₁₁; C₆H₁₃; —Cl; —Br; —I

*Example 4.—Condensation of 2,6-dimethylol-4-tt-octylphenol with 2,4-dimethylphenol*

To a solution consisting of five hundredths of a mol (13.3 g.) of 2,6-dimethylol-4-tt-octylphenol in 50 grams of 2,4-dimethylphenol is added one ml. of concentrated hydrochloric acid. After standing for 48 hours the reaction mixture is subjected to steam distillation and the non-volatile residue is then separated and allowed to solidify. The yield of the tri-nuclear condensation product, 2,6 - di - (2-hydroxy-3,5-dimethyl) benzyl-4-tt-octylphenol is practically quantitative. It forms easily a tri-acetate (M. P. 55–60° C.) upon refluxing with acetic acid anhydride. The structural formula of the product is as follows:

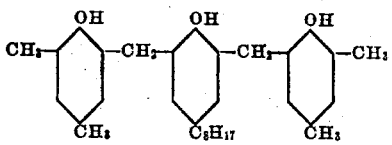

Similarly, as described above or as given in Example 3, one mol of 2,6-dimethylol-4-tt-octylphenol can be condensed with 2-methyl-4-tt-octyl-phenol to yield the same condensation product as described in Example 3. In a like manner, one mole of the above di-alcohol is condensed with any other 2,4- or 2,6-di alkylated or 2,4- or 2,6-dihalogenated phenol to yield tri-nuclear phenolic condensations of an analogous structure.

Although I have described the invention setting forth several embodiments thereof, the invention is not to be limited by such examples, which are intended to illustrate the breadth and character of the invention. Many changes in the details may be made, as for example, other phenols than specifically described may be used herein. The substituent groups designated as R may include other radicals than those specifically set forth in the specification. In general, R is to be considered as including the halogen and hydrocarbon groups. Various methods of producing the compositions of the present invention may be used and other catalysts than described herein may be found suitable for the purpose. These and other changes in the details of the invention may be made without departing from the spirit thereof and the invention is therefore to be broadly construed and not to be limited except by the character of the claims appended hereto.

I claim:
1. Polymeric phenolic condensation products prepared of a phenol with 2,6-dimethylol-4-tt-octylphenol.
2. Polymeric phenolic condensation products of a p-alkyl substituted phenol with 2,6-dimethylol-4-tt-octylphenol.
3. The polymeric phenolic condensation product of p-tt-octylphenol with 2,6-dimethylol-4-tt-octylphenol in equimolar quantities.

JOSEPH B. NIEDERL.

REFERENCES CITED

The following references are of record in the file of this patent:

UNITED STATES PATENTS

| Number | Name | Date |
|---|---|---|
| 1,880,566 | Weiler | Oct. 4, 1932 |
| 2,033,091 | Bruson | Mar. 3, 1936 |
| 2,049,447 | Honel | Aug. 4, 1936 |

OTHER REFERENCES

Ellis, "The Chemistry of Synthetic Resins" (1935), vol. I, pages 281-2, 291-4. (Copy in Div. 50.)

Granger, "Ind. Eng. Chem.," Aug. 1937, pages 860–866; "Ind. Eng. Chem.," Oct. 1937, pages 1125–29. (Copies of Granger articles are in Div. 50.)